United States Patent [19]

Martin

[11] Patent Number: 4,505,444
[45] Date of Patent: Mar. 19, 1985

[54] AIRCRAFT EJECTION SEAT SYSTEM

[75] Inventor: John S. Martin, Denham, Nr. Uxbridge, England

[73] Assignee: Engineering Patents & Equipment Limited, St. Peter, Channel Islands

[21] Appl. No.: 458,777

[22] Filed: Jan. 18, 1983

[30] Foreign Application Priority Data

Feb. 9, 1982 [GB] United Kingdom ............... 8203711

[51] Int. Cl.$^3$ ................. B64D 25/10; B64D 17/74
[52] U.S. Cl. ................ 244/122 AE; 244/150
[58] Field of Search ..... 244/122 A, 122 AB, 122 AC, 244/122 AD, 122 AE, 122 AH, 147, 150

[56] References Cited

U.S. PATENT DOCUMENTS

| | | | |
|---|---|---|---|
| 3,311,330 | 3/1967 | Hofferberth et al. | 244/141 |
| 3,530,868 | 9/1970 | Rickands | 244/122 AE |
| 3,547,383 | 12/1970 | Carpenter, Jr. | 244/150 |
| 3,787,011 | 1/1974 | Phillips et al. | 244/150 |
| 3,862,731 | 1/1975 | McIntyre | 244/122 AE |
| 4,057,206 | 11/1977 | Duncan et al. | 244/122 AE |

FOREIGN PATENT DOCUMENTS 814412 6/1959 United Kingdom .
1531710 11/1978 United Kingdom .

Primary Examiner—Trygve M. Blix
Assistant Examiner—Rodney Corl
Attorney, Agent, or Firm—Spencer & Frank

[57] ABSTRACT

An aircraft ejection seat system which incorporates means for permitting deployment of a main parachute at the end of a delay after ejection and a mode selector mechanism operable to permit such deployment at a shorter predetermined time after ejection if ejection takes place at low speed and low altitude. The mode selector mechanism incorporates a piston slidable along a bore to operate a firing pin to fire a cartridge and thus initiate the earlier deployment of the parachute. Means for sensing barometric pressure, air speed, and deceleration are arranged, if the sensed value indicates the longer delay period is required, to project respective plungers transversely into the bore to prevent the piston from striking the firing pin. A further plunger remains projected into the bore unless auxiliary sensing means positively senses low speed and altitude.

7 Claims, 7 Drawing Figures

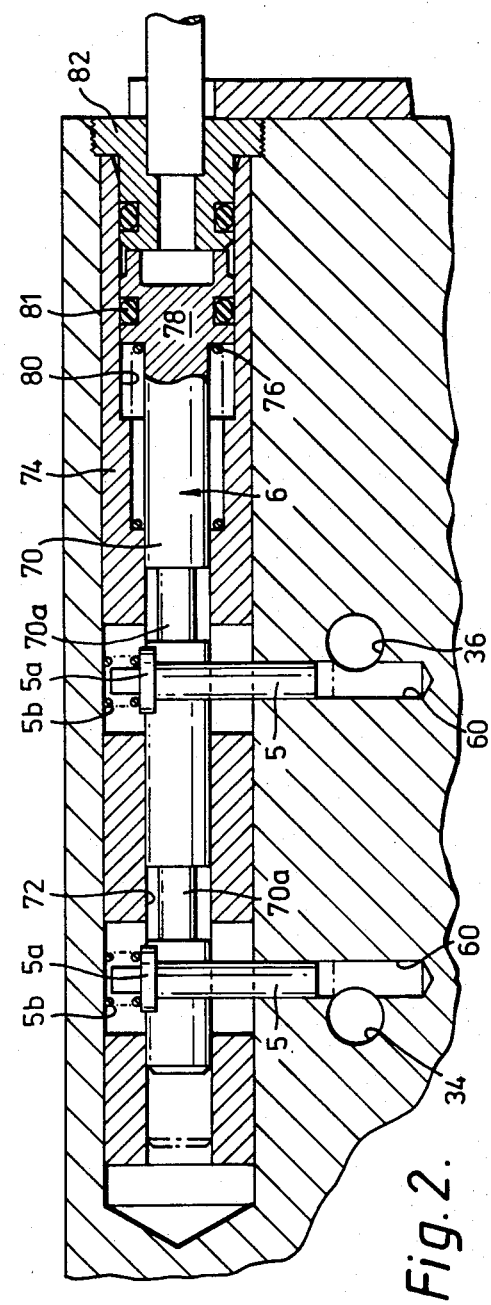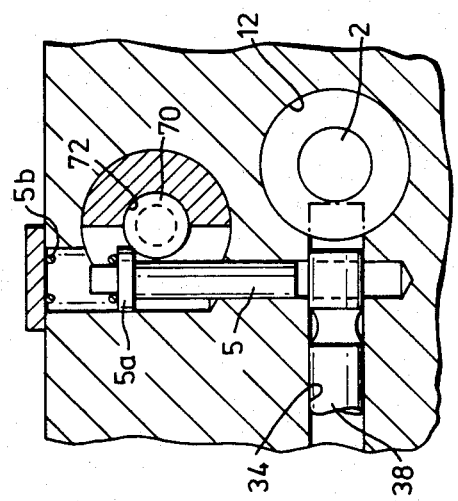
Fig. 2.
Fig. 3.

AIRCRAFT EJECTION SEAT SYSTEM

BACKGROUND OF THE INVENTION

This invention relates to aircraft ejection seat systems.

An aircraft ejection seat system is known in operation of which, following the ejection of the airman/seat combination from the aircraft, one or more drogue parachutes are first deployed, which ultimately bring about deployment of a main parachute with which the drogues are connected by a line, a predetermined delay between deployment of the drogue parachute or parachutes and the deployment of the main parachute being, however, ensured by arranging that the line connected with the drogue parachutes is initially connected fixedly with the ejection seat via a shackle, a time delay device associated with said shackle being arranged to allow the latter to open after a predetermined period to effect deployment of the main parachute. The purpose of this delay before allowing deployment of the main parachute is to allow the drogue parachutes, in the event that the ejection takes place while the aircraft is travelling at high speed, to slow the ejection seat/airman combination down sufficiently, before deployment of the main parachute, to prevent damage to the main parachute or the airman, which damage might otherwise occur through deployment of the main parachute at an excessive air speed. In one known arrangement, the delay before deployment of the main parachute is of the order of 1½ seconds.

The delay in deployment of the main parachute is, of course, unnecessary if ejection takes place while the aircraft is travelling at low speed, and if the aircraft is also relatively close to the ground, such delay may also be positively undesirable.

SUMMARY OF THE INVENTION

It is an object of the present invention to provide an aircraft ejection seat system by means of which the above noted difficulty may be avoided.

According to the present invention there is provided an aircraft ejection seat system incorporating means for permitting deployment of a parachute at the end of a delay after initiation of ejection of the seat/airman combination, and further incorporating a mode selector mechanism operable to permit such deployment at a shorter predetermined time after such initiation, in the absence of inhibiting action by sensing means incorporated in said mode selector mechanism, and arranged to effect such inhibiting action unless a predetermined condition or set of conditions is sensed by said sensing means.

Preferably said sensing means includes means for sensing the air speed of the ejected seat/airman combination and for providing such inhibiting action if the airspeed sensed is above a predetermined value.

BRIEF DESCRIPTION OF THE DRAWINGS

FIG. 2 is a sectional view of part of the mechanism of FIG. 1;

FIG. 3 is a view in section perpendicular to the plane of FIG. 2;

DESCRIPTION OF THE PREFERRED EMBODIMENT

Figure 1:
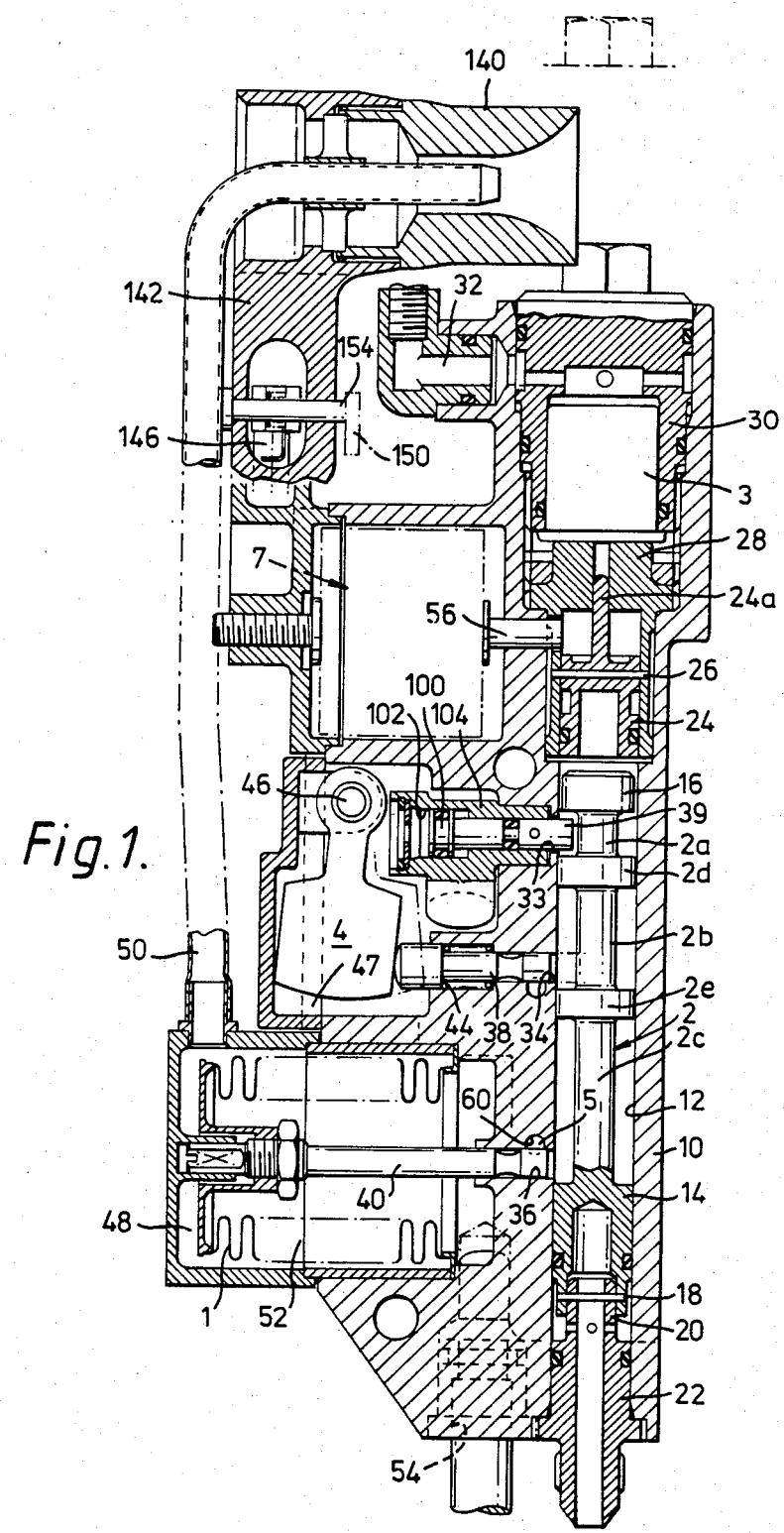
FIG. 1 is a schematic sectional view of a mode selector mechanism forming part of an ejector seat system embodying the invention.

The figures of the drawings illustrate a preferred embodiment of the invention.

The mechanism shown in the Figures is intended to be incorporated in an ejection seat similar in operation to that disclosed in British Patent Specification No. 814412 and in which initiation of ejection brings about the automatic execution of a sequence of actions comprising, in succession, the operation of an ejection gun to thrust the seat from the aircraft, the ignition of a rocket motor to propel the seat away from the aircraft and, after burn-out of the rocket motor, the firing of a drogue gun which projects, from the ejection seat, a piston to which is attached a line which opens a drogue container and draws out one or more drogue parachutes. In the ejection seat in which the mode selector mechanism shown in the drawings is intended to be incorporated, the end of said drogue line is held by a shackle (not shown) carried by the ejection seat, this shackle being arranged to be opened automatically by a gas-powered mechanism operable by pressurized combustion gases produced by the firing of a cartridge, which in turn is brought about by a mechanism including a time delay device and various sensing devices. The operation of the shackle release mechanism will not be described in detail here as it is known and does not, in itself, form the subject matter of the present invention. However, in broad terms, the operation of the shackle release mechanism is such that after the deployment of the drogues, the end of the drogue line is fixed to the seat by the shackle, and subsequent release of the drogue line by the shackle allows the drogues to draw out the main parachute, to which the drogue line is also attached, thereby deploying the main parachute.

In the ejection seat system of which the mode selector mechanism shown forms part, the time delay device, at least when ejection takes place at high air speed, operates to ensure that there is at least a minimum predetermined delay between deployment of the drogues and deployment of the main parachute.

The purpose of the above noted time delay is to allow the drogues to slow down the airman/seat combination to a speed at which the main parachute may be safely deployed, in the event that the airspeed at ejection is too high for safe immediate deployment of the main parachute. The shackle release mechanism normally also incorporates one or more sensing devices arranged to delay initiation of the operation of the time delay device until respective conditions sensed are fulfilled. For example, the shackle release mechanism may incorporate a barostat arranged to prevent the time delay device from starting to time-out its delay period until the seat/airman combination has dropped below a predetermined altitude.

It will be appreciated that the automatic minimum delay introduced by the device is unnecessary, (and therefore may be undesirable), if ejection takes place at an air speed low enough to allow safe immediate deployment of the main parachute, and the purpose of the mode selector mechanism shown in the drawings is to allow this time delay to be avoided if conditions are such that it is safe to do so.

Referring to FIG. 1, the mode selector mechanism includes a casing 10, adapted to be secured to the ejection seat, and which casing 10 provides internally a bore 12 in which is slidably accommodated a piston 2. At one end of the piston 2 is a piston head 14 sealingly engaged with the wall of the bore 12, and the opposite end of the piston 2 is provided with a striker foot 16. The piston 2 is normally restrained from axial movement in the bore 12 by means of a shear pin 18 which extends diametrally through the walls of a cylindrical socket provided at the end of the head 14 remote from the foot 16 and which socket receives an end portion 20 of a hollow tubular insert 22 which is sealingly engaged in a the bore 12 and is fixed to the housing adjacent the lower end of the bore 12 as viewed in FIG. 1. The passage through the interior of the insert 22 is connected by a conduit (not shown) to the firing chamber of the drogue gun or to a separate gas generator incorporating a cartridge arranged to be fired at the appropriate time by means incorporating a further timing device. The arrangement is such that when the gas pressure within the insert 22 and at the head of the piston 2 exceeds a predetermined value, the shear pin 18 is broken, allowing the piston 2 to move, under the action of said gas pressure, upwardly in FIG. 1 to strike a firing pin 24 disposed at the upper end of the cylinder 12. When this occurs, a further shear pin 26 is broken, this pin extending diametrally through the firing pin 24 and into the walls of a hollow cylindrical firing pin support 28 which is coaxial with the cylinder 12 and which supports the firing pin 24 for axial sliding movement therein. When the shear pin 26 is thus broken, provided that movement of the firing pin 24 is not blocked by a barostat 7 (see below) the firing pin 24 is thrust upwardly in FIG. 1 so that a firing projection 24a thereon is extended through a complementary axial passage in the support 28 to fire a cartridge 3 which is held in a chamber provided in a block 30 secured at the upper end of the housing 10 and which chamber is connected, via a passage 32, with the gas-powered shackle release mechanism. Thus, when the cartridge 3 is fired, the shackle releases the drogue line from the seat, so that the drogue line can draw out the main parachute.

The piston 2 has, intermediate the head 14 and foot 16, three reduced-diameter portions 2a, and 2b and 2c spaced apart axially by portions 2d and 2e of enlarged diameter. Transverse bores 33, 34 and 36 meet with the bore 12 at locations which are slightly to the left of the portion 2d, the portion 2e and of the head 14 respectively, as viewed in FIG. 1, when the piston 2 is in its position displaced fully downwardly in FIG. 1. Mounted for sliding movement along the bore 34 is a plunger 38 associated with a deceleration sensing device, while a plunger 40, associated with an air-speed sensing device, is mounted for sliding movement along the bore 36. The arrangement is such that if the plunger 40 is projected into the bore 12, movement of the piston 14 along the bore 12 to engage the firing pin 24 is prevented by abutment of the plunger 40 with the piston head 14, whilst if the plunger 38 is projected into the bore 12, such movement is prevented by abutment of the plunger 38 with the enlarged diameter portion 2e. A plunger 39, associated with a further combined air speed and altitude sensing device, is held by a shear pin in a position in bore 33 in which plunger 39 projects into bore 12. The plunger 39 thus prevents movement of piston 2 along the bore 12 to engage firing pin 24 unless plunger 39 is retracted as described below.

The plunger 38 is biased axially, by means of a compression spring 44, in the direction away from bore 12 and into engagement with a weight 4 mounted for swinging movement about a pivot 46 in a chamber 47 in the housing 10. When the ejection seat, and thus the mode selector mechanism, is at rest, or is moving at uniform velocity, the weight 4 is urged by the spring 44, via the plunger 38, into the position shown in which the weight is held against a wall of the compartment 47. However, if the deceleration to which the ejection seat/airman combination is subjected upon ejection from an aircraft, (as a result of the drag exerted by the drogues against forward motion of the seat in the same direction as that in which the aircraft is moving), is above a predetermined level, the inertia of the weight 4 is sufficient to overcome the force of the spring 44 with the result that the weight 4 projects the plunger 38 into the bore 12.

The plunger 40 is connected with a bellows unit 1 which forms part of an air-speed sensor. Thus, the chamber 48 on the outside of the bellows unit 1 is connected, via a conduit 50, with a pitot head mounted on the ejection seat, whereas the chamber 52 inside the bellows unit is connected via a conduit 54 with a static air pressure inlet (not shown) at the rear of the seat. The arrangement is such that if the forward air-speed of the ejection seat exceeds a predetermined value, the bellows unit 1 is compressed, projecting the plunger 40 into the bore 12, whereas if the forward air-speed of the ejection seat is below that predetermined value, the plunger 48 remains withdrawn from the bore 12.

The barostat 7 is connected with a plunger 56, accommodated for axial movement in a transverse bore which extends into the bore 12 and through the peripheral wall of the firing pin guide 28, and when the plunger 56 is fully projected into the bore 12, the plunger 56 lies in the path of the firing pin 24 so as to block the passage of the same towards the cartridge 3 and thus prevent firing of the cartridge 3. This will occur when the ambient atmospheric pressure is below a predetermined value, corresponding to the seat being above a predetermined altitude. At lower altitudes, the plunger 56 is progressively retracted from the firing pin guide 28 and below a predetermined altitude the plunger 56 presents no obstruction to the movement of the firing pin 24.

Each of the plungers 38 and 40 has, adjacent its end nearer the bore 12, a peripheral groove which has a part-circular profile in axial section through the respective plunger. Respective bores 60 in the housing 10 extend in directions perpendicular with the axes of the plungers 38 and 40 and likewise perpendicular with the axis of bore 12, each said bore 60 intersecting a respective one of the bores 34, 36. Each of the bores 60 has slidably mounted therein a respective locking plunger 5 (see FIG. 2), and the arrangement is such that when either of the plungers 38, 40 is fully projected into the bore 12, (such projection being, for example, limited by engagement of the respective plunger with the reduced portion 2b or 2c of the piston 2), the respective bore 60 is unobstructed, as the circumferential groove of the respective plunger is in register with the bore 60, and thus, if the respective locking plunger 5 is otherwise free to move (see below) it can be moved axially to a position in which it extends partially into the respective bore 34 and 36, in the respective peripheral groove. It will be appreciated that so long as the respective locking plunger remains in this projected position, axial movement of the respective plunger 38, 40, out of the bore 12 is prevented.

As shown in FIGS. 2 and 3, each of the locking plungers 5 has an enlarged head 5a upon which a compression spring 5b acts to urge the plunger towards the locking position. The plungers 5 are, however, normally held in position retracted from their locking positions by abutment of the heads 5a with the surfaces of respective portions of a cylindrical rod 70 which is slidable along a complementary cylindrical bore 72 formed in an insert 74 fixed in the housing 10, the bore 72 extending parallel with the bore 12. The rod 6 is normally held in a limiting position to the right in FIG. 2 by means of a compression spring 76 acting between a shoulder provided at one end of an enlarged portion of the bore 72 and an enlarged portion of the rod which forms a piston head 78 which is sealingly slidable in a cylindrical portion 80 of the bore 72 and is sealed with respect thereto by an O-ring 81. The bore portion 80 is sealed at its right end in FIG. 2 by a plug 82 fixed in the housing, the plug having a central passage therethrough connected via a conduit with the combustion chamber of the rocket motor initiator. (The rocket motor initiator includes a cartridge which is fired by a firing mechanism operated by a static line connected with the aircraft, when the seat is ejected, to initiate firing of the rocket motor). Thus, when the rocket motor initiator cartridge is fired, the rod 70 is urged to the left in FIG. 2 against the bias of the spring 76, into a limiting position at the right in which the head 78 engages the annular shoulder formed around the inner end of the bore portion 80.

Alternatively the central passage in the plug 82 may be connected with a separate gas generator in which a cartridge is arranged to be fired by a mechanism operated by a static line connected with the aircraft, when the seat is ejected.

In this extreme right position of the rod 70 as viewed in FIG. 2, cylindrical portions 70a of the rod 70, which portions 70a are of reduced diameter with respect to the portions upon which the heads 5a normally rest, are brought into register with the positions of the heads 5a. As shown in FIG. 3, the diameters of the portions 70a are sufficiently small to allow the heads 5a to pass, allowing either plunger 5 to be projected into its locking position should the respective bore 60 be unobstructed by the respective plunger 38, 40. The housing 10 and the insert 74 are, of course, cut away in the region of the heads 5a to allow free movement of the plungers.

The plunger 39 forms part of a system which parallels the barostat 7 and the air speed sensor 1, 40. The system is arranged to retract the plunger 39 only if the air-speed sensed by the system is less than a predetermined value, for example less than 300 knots, and if the altitude of the aircraft is below 7000 ft.

The plunger 39 is formed by the cylindrical piston rod of a piston 100 which works in a cylindrical bore 102 formed in a housing 104 mounted in the casing 10, the plunger 39 extending closely through a bore, of reduced diameter with respect to bore 102, but coaxial therewith, in the housing 104. The plunger 39 is sealed with respect to this reduced diameter bore by an O-ring.

The housing 104 is, in the embodiment shown, mounted in the chamber 47 which receives the weight 4.

Figure 4:
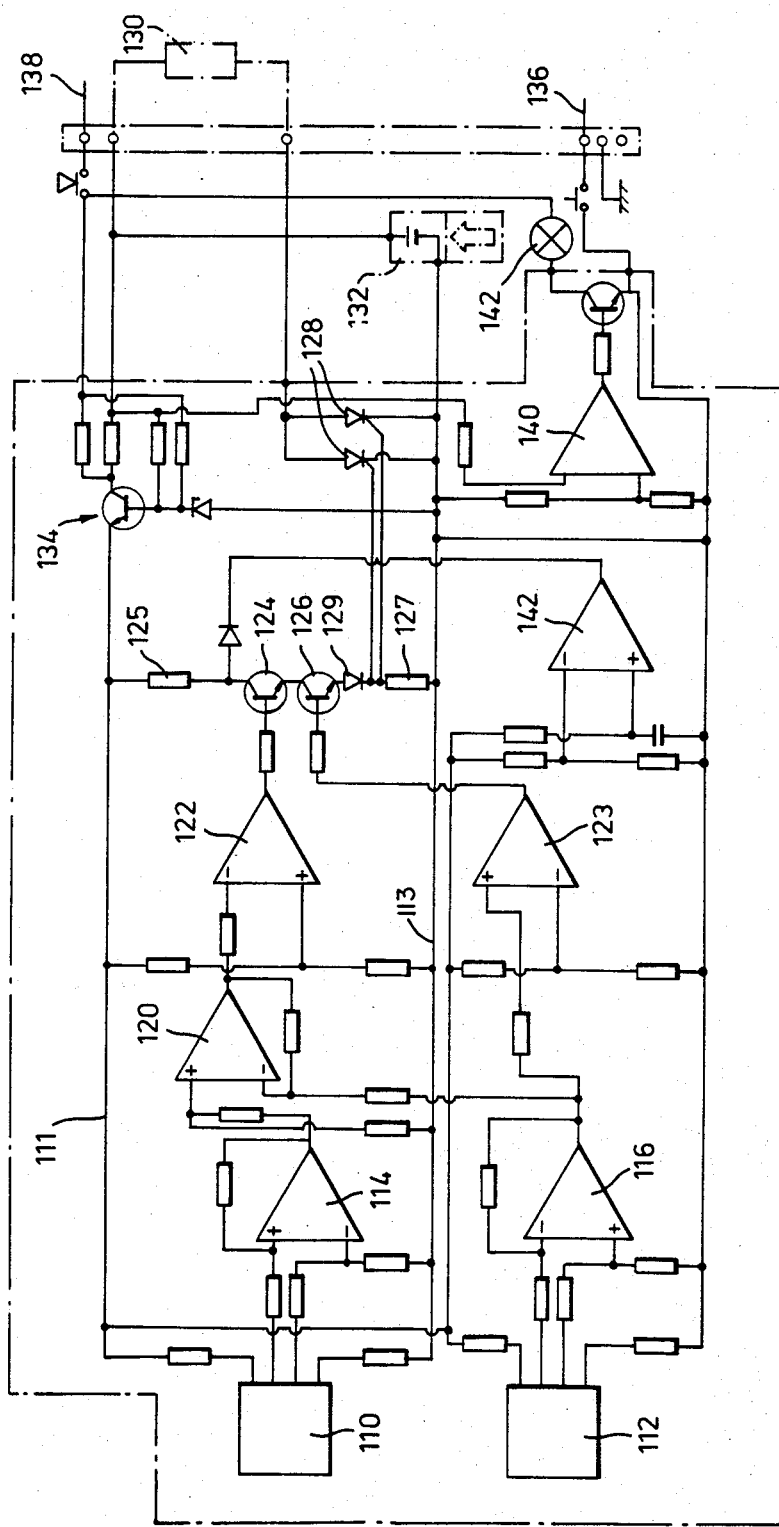
FIG. 4 is a circuit diagram of electrically operable sensing means forming part of the ejector seat system.

The chamber formed in the bore 102 between the piston 100 and the end, (the right end in FIG. 1), of the housing 104 through which the plunger 39 extends is connected, by an appropriate conduit (not shown) with a closed chamber (not shown) in which is located a cartridge or squib which can be ignited electrically by passing an electric current through electrical leads extending thereto from an electronic air-speed and height sensing device illustrated schematically in FIG. 4.

Referring to FIG. 4, the circuit shown comprises two electronic pressure transducers 110, 112, conveniently of the type arranged to provide an electrical output which is a measure of the absolute gas pressure to which the transducer is subjected. The transducers 110 and 112 have respective fluid inlets for connection to the gas source of which the pressure is to be measured. The transducer 110, referred to hereinafter as the pitot pressure transducer, has its fluid inlet connected, via a flexible conduit, with a first pressure-sensing venturi or pitot head.

The transducer 112, hereinafter referred to as the static pressure transducer, has its fluid inlet connected to an appropriate static source, for example an outlet somewhere on the rear of the seat.

The output connections of the transducer 110 at which the transducer provides an electrical signal corresponding to the pressure sensed are applied to inputs of an amplifier 114, while the corresponding output connections of transducer 112 are applied to inputs of an amplifier 116. The output of amplifier 116 is connected to the inverting terminal of a differential amplifier 120, while the output of amplifier 114 is connected to the non-inverting terminal of this amplifier 120. The output of amplifier 120 is connected to one input of a comparator 122 which has a second input connected to a reference voltage source, constituted by a potentiometer connected between the positive and negative power supply lines 111 and 113 respectively of the circuit. The output of amplifier 116 is also connected to one input of a comparator 123 which has a second input connected to a reference voltage source constituted by a further potentiometer connected between the supply lines 111 and 113. The outputs of comparators 122 and 123 are connected to respective inputs of an AND gate consisting of two transistors 124 and 126 respectively connected in "totem pole" configuration, in series with resistors 125 and 127 and diode 129 between the supply lines 111 and 113. The junction between resistor 127 and diode 129 is connected to the trigger inputs of parallel silicon controlled rectifiers 128. The arrangement is thus such that the SCRs 128 will be turned on if and only if both transistors 124 and 126 are turned on.

The voltage reference for comparator 123 is so adjusted that the transistor 126 will be turned on for pressures sensed by the transducer 112 which are greater than mean atmospheric pressure at 6,350 ft, (i.e. when the altitude of the unit is less than this value).

The circuit is so arranged that the output of the differential amplifier 120 is proportional to the pitot pressure as sensed by transducer 110 minus the static pressure as sensed by transducer 112, and thus provides a measure of the air speed of the seat. The voltage reference for comparator 122 is so adjusted that the transistor 124 will turn on for air speeds less than 300 knots.

The firing mechanism of the squib referred to above, indicated schematically at 130, is connected in series with SCRs 128 and the power source 132 of the circuit so that when the SCRs 128 are triggered while the power source 132 is activated, the squib 130 is ignited.

The power source 132 for the circuit is preferably a thermal battery arranged to be activated by a gas-powered percussion-fired primer, operated by the pressure of the gas produced by operation of the main rocket motor initiator, with which the percussion mechanism is connected by means of a suitable conduit. Thus, the circuit is automatically supplied with electrical power very shortly after the ejection of the seat is initiated.

The negative terminal of the power source 132 is connected directly with the supply line 113 while the positive terminal of source 132 is connected with the supply line 111 via a voltage regulator 134. A test facility for the circuit is provided whereby the aircraft power supply, on conductors 136 and 138, may be connected, via respective poles of a two-pole test switch, respectively directly with line 113 and with the line 111, via the voltage regulator 134.

When the test switch is operated, when the aircraft is on the ground, if the circuit is operational, the SCRs 128 will be switched on and a current will pass through the squib ignitor 130. However, because this current must pass through the squib ignitor via the resistors connecting the test switch and the power source 132 respectively with the regulator 134, this current is insufficient to ignite the squib. However, the voltage drop due to the current flowing through the squib ignitor is detected by an amplifier 140, which, via a driving transistor ignites a lamp 142.

The circuit also includes a delay facility, comprising a differential amplifier 142 having respective inputs connected with a voltage divider connected across the lines 111, 113 and with the junction between a capacitor connected with line 113 and a resistor connected with line 111, so that after a voltage is applied across the lines 111, 113, there is a predetermined period over which the output of amplifier 142 is held low, i.e. close to that of line 113. The output of amplifier 142 is connected via a diode with the low side of resistor 125 so that during said predetermined period the transistors 124 and 126, diode 129 and resistor 127 are effectively short circuited. The delay facility serves to ensure that the squib 130 is not inadvertently ignited while the voltage of power source 132 is still indeterminate or before ejection of the seat from the aircraft has been completed, at a time when false readings of air speed and altitude might be likely to occur.

Figure 5:
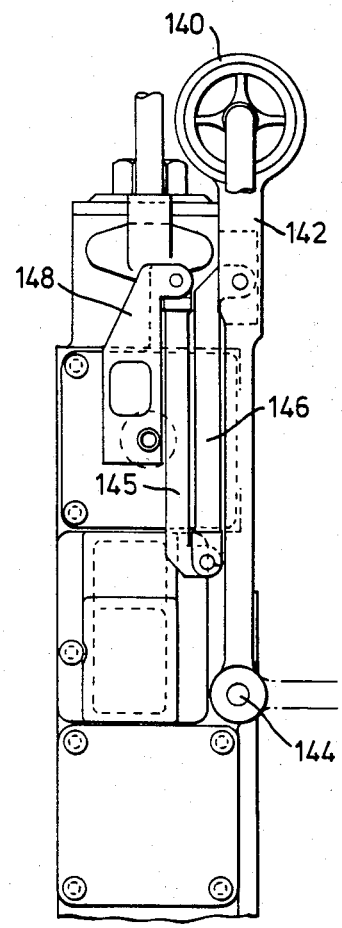
FIG. 5 is a partial view, in rear elevation of an upper part of the ejector seat showing the mounting of a stowable and extendable pitot head forming part of an airspeed sensing device of the system.
Figure 6:
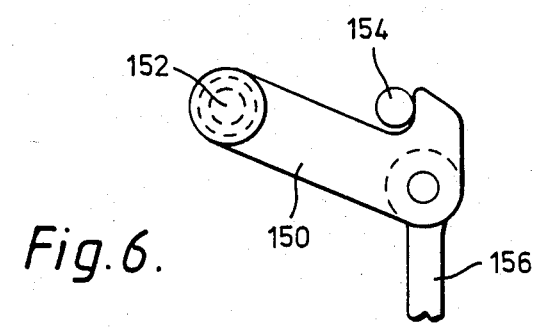
FIG. 6 is a rear elevation view of a detail.

The bellows 1 and pilot transducer 110 are both connected, via respective flexible conduits, with respective venturi pitot heads of which one is indicated at 140 in FIG. 5, which is a view, in elevation, looking in a forward direction, of part of the rear of the ejection seat. Each pitot head 140 is carried on the upper end of an arm 142 pivotally connected to the casing 10 at its lower end at 144 for pivoting about an axis extending horizontally in the fore-and-aft direction so that the pitot head 140 can swing from the position shown in FIG. 5 in full lines, in which it lies within a space behind the seat headrest, and the position shown in dotted lines in which it is projected laterally outwardly from the seat beyond the head rest so as to lie in the air stream when the seat is ejected. The arm 142 is arranged to be moved to its laterally projected position and supported in this position by a linkage comprising arms 145 and 146 of approximately equal length, the arm 146 being pivotally connected at its upper end to the arm 142 at a position spaced above the pivot 144 and being pivotally connected at its lower end to the lower end of the arm 145, while the arm 145 is pivotally connected at its upper end to a bracket 148 carried by the casing 10 of the mode selector mechanism, which casing, of course, is itself fixed to the seat frame. Hairpin springs, (not shown) are provided at the pivotal connections between the members 148, 145, 146 and 142, acting between the pivotally connected members so as to tend to move the arms 145 and 146 apart and thus thrust the pitot to its projected position. The arm 142 is normally held in its retracted position by means of a detent 150 (see FIG. 6) pivotally connected at 152 to the casing 10 and having a hooked end normally engaged around a rod 154 formed as an extension of the pivot rod affording the connection between the arms 146 and 142, the detent 150 being adapted to be swung downwardly, to release the arm 142 for swinging outwardly, by means of a lanyard 156 which is appropriately secured to the aircraft structure so that the venturi is projected outwardly as the seat is ejected. This arrangement has the advantage that during normal use of the aircraft, the pitot heads are stowed flush with the headrest of the seat to prevent the ingress of dirt and to avoid interference with rearward visibility from the seat. When deployed the pitot arms 145, 146, 142 mechanically lock in the extended position.

The result of the arrangement described is that immediately upon ejection of the seat from an aircraft, the locking plungers 5 are released for movement towards their locking positions and if, at that time, either plunger 38 or plunger 40 is in its fully projected position, the respective locking plunger 5 moves to its locking position, thereafter retaining the respective plunger 38, 40 in its projected position and preventing firing of the cartridge 3. Even if the sensor 1 indicates that the air speed is low and the sensed deceleration at the time of ejection is low, so that neither plunger 38 or plunger 40 is projected, movement of the piston 2 and firing pin 24 sufficiently to fire cartridge 3 is prevented by the barostat 7 if the ejection seat is at an altitude above a predetermined value. If firing of cartridge 3 is thus inhibited by plungers 40, 38 or 56, the shackle release mechanism is not operated to release the drogue line and allow deployment of the main parachute until operation of the time delay device associated therewith has been initiated and the appropriate delay period has been timed-out. If the barostat 7 and sensor 1 indicate that the altitude and air-speed respectively are low, if the circuit incorporating transducers 110 and 112 does not confirm this, so that plunger 39 remains projected into bore 12, the firing of cartridge 3 is likewise inhibited. On the other hand, if ejection takes place at low air-speed and relatively low altitude, so that the piston 2 operates to fire cartridge 3 upon firing of the drogue gun or on firing of the separate, static-line-operated, gas generator, the shackle is opened immediately so that the drogue piston pulls out the drogue or drogues and the main parachute in one operation. The deceleration sensing device incorporating weight 4 is provided as a "back-up" in case of a malfunction of the pitot static system.

The locking plungers 5 function to ensure that the values of deceleration and airspeed upon which are based the selection of the operational mode using the normal time delay or of the mode excluding such delay, are the respective maximum values, which occur when the seat has just left the aircraft cockpit. Since, in the event that ejection takes place at a high altitude, the rate of change of atmospheric pressure will normally be relatively slow, it is unnecessary to utilize such a locking pin arrangement for the plunger 56 of the barostat 7.

Figure 7:
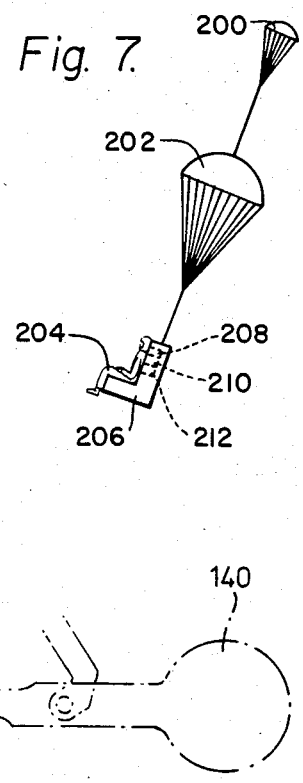
FIG. 7 is a perspective view illustrating deployed parachutes slowing an airman.

FIG. 7 illustrates a drogue parachute 200 connected to a main parachute 202 which is slowing an airman 204 in seat 206 after the parachutes have been deployed by the operation of release/deployment mechanism 208, delay mechanism 210, and mode selector mechanism 212.

While, as will be appreciated, the primary utility of the invention, at the present time, is in relation to aircraft, it will be noted that the invention could be utilized in other vehicles, such as space vehicles, and the terms "aircraft" and "airman" as used herein are therefore intended to comprise, in addition to their normal meanings, respectively any other vehicle and an occupant thereof.

What is claimed is:

1. An aircraft ejection seat system having an ejection seat for accommodating an airman and a main parachute for lowering the airman to the ground, comprising:
   means for permitting deployment of said main parachute at the end of a delay after initiation of ejection of the seat/airman combination, said means including a drogue parachute operationally connected to said ejection seat and means for deploying said drogue parachute a predetermined time after said initiation of ejection; and
   mode selector mechanism means for sensing at least one predetermined condition and for permitting deployment of said main parachute at a time prior to expiration of said delay provided that a predetermined condition is sensed, said mode selector mechanism means including means for sensing deceleration of the seat/airman combination by the drogue parachute and means for inhibiting operation of said mode selector mechanism means resulting in deployment of said main parachute after said time prior to expiration of said delay if said deceleration exceeds a predetermined value, wherein said means for inhibiting operation of said mode selector mechanism means includes an abutment member, said means for sensing being operable to move said abutment member from a withdrawn position to an inhibiting position when said deceleration exceeds said predetermined value, a locking member movable between a retracted and a locking position, and spring means for urging the locking member towards its locking position, said locking member in its locking position holding said abutment member in its inhibiting position so that said abutment member, if moved to said inhibiting position after release of the locking member, is held permanently in said inhibiting position.

2. An aircraft ejection seat system having an ejection seat for accommodating an airman and a parachute for lowering the airman to the ground, comprising:
   a release mechanism operable to release said parachute;
   means cooperating with said release mechanism for permitting delayed deployment of said parachute after initiation of ejection on the seat/airman combination, said means including a delay device which, after actuation thereof, can operate said release mechanism after a predetermined delay; and
   mode selector mechanism means for operating said release mechanism at a shorter predetermined delay after said initiation of ejection, said mode selector mechanism means including
   a casing having a passage,
   a member mounted for movement in said passage, said member having a plurality of abutments at intervals therealong,
   means for urging said member along said passage from a first position to a second position a predetermined time after said initiation of ejection,
   means cooperating with said member for initiating operation of said release mechanism when said member reaches said second position,
   a plurality of sensing devices,
   a plurality of plungers, each plunger corresponding to a respective sensing device and being movable, in dependence on the respective quantity sensed, transversely with respect to said passage from a position withdrawn from said passage to a position projecting into said passage so as to obstruct, by engagement with a respective one of said abutments of said member, movement of said member to said second position when said member is moved toward said second position from said first position,
   a movably mounted detent element, and
   a plurality of locking elements, each locking element corresponding to a respective one of said plungers and being biased for movement, when said corresponding plunger projects into said passage and when released by said detent element, into a locking position preventing withdrawal of said corresponding plunger,
   wherein said detent element is common to all said locking elements, said detent element being movable from a position preventing said locking elements from moving to their locking positions to a position allowing such movement after said initiation of ejection and before said member is urged from said first toward said second position thereof.

3. An aircraft ejection seat system according to claim 2, wherein said parachute is a main parachute and furher comprising a drogue parachute operationally connected to said ejection seat and means for deploying said drogue parachute a predetermined time after said initiation of ejection of the airman/seat combination, and wherein one of said plurality of sensing devices comprises means for sensing the deceleration of the airman/seat combination by the drogue parachute so that the plunger corresponding to said one of said plurality of sensing devices can move into said passage and inhibit operation of said mode selector mechanism means resulting in deployment of said main parachute after expiration of said shorter predetermined delay if said deceleration exceeds a predetermined value.

4. An aircraft ejection seat system according to claim 2, further comprising further sensing means for sensing barometric pressure, and thus the altitude of the airman/seat combination, and means for inhibiting operation of said mode selector mechanism means resulting in deployment of said parachute after expiration of said shorter predetermined delay if the barometric pressure sensed is below a predetermined value.

5. An aircraft ejection seat system according to claim 2, wherein said casing has a cylindrical cavity therein and said detent element comprises a piston mounted for movement within said cylindrical cavity under the action of gas pressure to the position allowing movement of the locking elements to their locking positions.

6. An aircraft ejection seat system according to claim 2, wherein one of said plurality of sensing devices comprises means for sensing the air speed of the ejected seat/airman combination so that the plunger corresponding to said one of said plurality of sensing devices can move into its position projecting into said passage and inhibit operation of said mode selector mechanism means resulting in deployment of said parachute after expiration of said shorter predetermined delay if the airspeed is above a predetermined value.

7. An aircraft ejection seat system according to claim 6, further comprising further sensing means for sensing barometric pressure, and thus the altitude of the airman/seat combination, means cooperating with said further sensing means for inhibiting operation of said mode selector mechanism means resulting in deployment of said parachute after expiration of said shorter predetermined delay if the barometric pressure sensed is below a predetermined value, and means for sensing the air speed and altitude of the ejected airman/seat combination and inhibiting operation of said mode selector mechanism means resulting in deployment of said parachute after expiration of said shorter predetermined delay unless the air speed and altitude are both below respective predetermined values.

* * * * *